United States Patent [19]
Baudin

[11] Patent Number: 5,916,646
[45] Date of Patent: Jun. 29, 1999

[54] CONTAINER HAVING A DECORATIVE LABEL AND A METHOD FOR OBTAINING THIS CONTAINER

[75] Inventor: Gilles Baudin, Domont, France

[73] Assignee: L'Oreal, Paris, France

[21] Appl. No.: 08/818,879

[22] Filed: Mar. 17, 1997

[30] Foreign Application Priority Data

Mar. 15, 1996 [FR] France ............................. 96 03311

[51] Int. Cl.⁶ .................................................. B29C 49/24
[52] U.S. Cl. ..................... 428/36.1; 428/36.1; 428/36.5; 215/12.1; 215/382
[58] Field of Search ................................ 428/36.1, 36.5; 215/12.1, 382

[56] References Cited

U.S. PATENT DOCUMENTS

| | | |
|---|---|---|
| 3,657,043 | 4/1972 | Ploetz et al. . |
| 4,953,094 | 8/1990 | Letcher, Jr. . |
| 5,266,377 | 11/1993 | Kinoshita et al. . |
| 5,448,687 | 9/1995 | Hoogerhyde et al. . |

FOREIGN PATENT DOCUMENTS

| | | |
|---|---|---|
| 2 607 432 | 6/1988 | France . |
| 1 604 577 | 2/1970 | Germany . |
| WO 94/26498 | 11/1994 | WIPO . |

OTHER PUBLICATIONS

Japanese Abstract; vol. 94, No. 011; JP-A-06 328547; Nov. 29, 1994.

Japanese Abstract; vol. 10, No. 211 (M-501); JP-A-61 051322; Jul. 24, 1986.

Primary Examiner—Jenna Davis
Assistant Examiner—Jason Savage
Attorney, Agent, or Firm—Oblon, Spivak, McClelland, Maier & Neustadt, P.C.

[57] ABSTRACT

A container and a method for making the same. The container has a body made of a first thermoplastic material, with a non-developable external surface provided with at least one decorative label formed of at least one layer made of a second thermoplastic material, and having an air evacuation structure. The second material has a fusion temperature higher than the fusion temperature of the first material. This method permits labeling without the formation of creases or air bubbles, in particular on a container having a non-developable surface.

10 Claims, 1 Drawing Sheet

CONTAINER HAVING A DECORATIVE LABEL AND A METHOD FOR OBTAINING THIS CONTAINER

BACKGROUND OF THE INVENTION

1. Field of the Invention

The present invention relates generally to a container, and more particularly to a thermoplastic container provided with a decorative label. This container is, in particular, a container with a neck intended to contain a product to be dispensed, the label serving to identify the product or its properties, and/or to indicate the directions for use of the product. This container may be used in the fields of cosmetics, agricultural food products, dermatology, household or paint products.

More particularly, the container is a bottle, a tube-type bottle, or a tube, whose body includes one or several non-developable surfaces. Usually, containers of this kind are obtained by the extrusion or injection of a parison at a temperature higher than the fusion temperature of the material constituting it and by blow molding the parison in an appropriate mold.

2. Discussion of the Background

In conventional methods, it is easy to fix a decorative label on containers with a developable surface having a cylindrical shape by straightforward glueing, for example by using a self-adhesive label made of paper which has been previously decorated in its flat state. This labeling adds a step to the construction of the container, and as a result it complicates the manufacture of the container.

About twenty years ago, a combined method was developed for blow molding a bottle with simultaneous labeling. This involves depositing a parison and a label made of paper or a plastic material in an appropriate openable mold and positioned opposite one another. This method is known under the name of "IML" (In-Mold Labeling). After the parison has been blow-molded, and before it has been taken out of the mold, the label is welded onto an external surface of the final container. This combined method is an improvement compared to glueing the label after removal from the mold, since the decorated container can be obtained in a single step. Another advantage is that the label can be made of a plastic material that virtually does not deteriorate. Because of this, during use of the product introduced into the container, the label can be neither spoiled nor detached as a result of the action of humidity or of product residues flowing over the label due to oversight on the part of the user. Moreover, this method makes it possible to obtain a unit with a perfectly smooth surface, in particular in the transition zones between the edges of the label and the body of the container. In other words, the label is "embedded" in the wall of the container.

However, the IML process has the major drawback that it is only applicable to the decoration of containers with developable surfaces. Indeed, when one is concerned with a container whose body includes a non-developable surface with a complex curvature, for example concave and convex zones, neither the depositing of a self-adhesive label, nor the application of the IML process are possible with the labels that are currently used, without the forming of creases in the label, without tearing the label, and/or without forming of unsightly air bubbles between the external surface of the container and the label. This effect is even more of a nuisance when the label is in part transparent.

To improve the attachment of the label and to prevent the formation of air bubbles between the surface of a bottle with a non-developable surface and the label, it is envisaged in WO-A-88 08361 to obtain asperities in the mold intended to allow air to escape between the label and the external surface of the bottle. Low pressure or suction is applied at the same time. This process has, on the one hand, a drawback that it is complicated and expensive, and on the other hand, the disadvantage that it produces a bottle with little aesthetic appeal because of the asperities that are visible on the label.

Moreover, DE-A-1 604 577 discloses a plastic label having air evacuation means intended to be fixed onto a blow-molded plastic container. These means are obtained in the form of perforations or striations. The containers to be provided by this prior document have a developable surface. The fusion temperature of the material of the label is equal to, or less than, the fusion temperature of the material constituting the container. In these conditions, an application of the label onto a non-developable surface of a container is not possible without deterioration of the label during the thermoforming of the finished container.

SUMMARY OF THE INVENTION

The object of the present invention is to manufacture a container according to the known IML process, while preserving its advantages and adapting it in particular to non-cylindrical containers, and avoiding all the drawbacks of the prior art.

Thus the invention proposes a container that is more economical than the containers of the prior art, and the method for obtaining it is simpler than that described in WO-A-88 08361.

The present invention relates to a thermoplastic container as well as to a method for obtaining it. This container has a body made of a first thermoplastic material, with a non-developable external surface provided with at least one decorative label made of at least one layer of a second thermoplastic material and comprising air evacuation means. According to the invention, the second material has a fusion temperature higher than the fusion temperature of the first material. In general, the term "non-developable" is intended to mean any surface that cannot be obtained from a plane without tearing or folding. It is, in particular, containers of this kind which are aimed at by the present invention.

The air evacuation means may be formed by at least one perforation and preferably a multitude of perforations, the population density of the perforations being in particular less than 10 perforations/$cm^2$.

Advantageously, the thickness of the label is from approximately 50 $\mu$m to approximately 300 $\mu$m, and preferably from 80 $\mu$m to 120 $\mu$m. In practice, this thickness is chosen according to the curvature of the part of the container body surface where the label has to be applied, or according to the fusion temperature of the second material.

This label may be opaque or transparent. Advantageously, it has been previously decorated, for example, by serigraphy, by offset or by process engraving.

Advantageously, the zone of the label permeable to air may be microperforated. For this purpose, the label may be provided with one or several perforations whose diameter is in the range extending from 0.05 mm to 0.5 mm. These perforations may be obtained mechanically, by electrical discharge, or by laser piercing. They are advantageously distributed in a regular manner over the whole surface of the label.

It is also possible to use a thermoplastic label having microgrooves on that surface which is intended to adhere to the container, these microgrooves serving to evacuate the air between the label and the body of the container during the blow molding of the container.

According to another possibility, the label may be made of a thin layer of an air permeable nonwoven material formed by thermoplastic fibers.

Advantageously, the first thermoplastic material is chosen from polypropylene, polyethylene, or polyethylene terephthalate etc., allowing the container to be manufactured by blow molding a parison in an appropriate mold. This blow molding technique makes it possible to obtain containers whose body has a complex non-developable surface which may have concave or convex zones, in particular concave zones with a progressive curvature.

As for the label, it is made of a thin sheet of the second thermoplastic material which may be compatible or non-compatible with the material forming the body of the container and is, in particular, capable of adhering by heat welding to the body of the container during thermo-forming of the container. The second material is chosen, for example, from polyethylene, polypropylene etc. It forms the label in a single layer or multilayer mode.

When the first and second materials are incompatible with one another, it is advantageous to provide a coating of a third thermoplastic or thermoreactive material on one side of the label so as to form the bond with the body of the container. In this case, the third material may be chosen from materials similar or close to the first material of the body of the container, or from thermoreactive adhesives compatible with the first material.

The use of a label that is heat weldable and air permeable allows the decorated container to be manufactured by the IML process in a single tooling operation.

Thus, the invention also provides a method for manufacturing a container provided with a label which lies in effecting the following steps:

placing a parison made of a first thermoplastic material into the inside of an appropriate openable mold, the said parison being at a temperature higher than the fusion temperature of this first material;

placing into the mold opposite the parison at least one air permeable label formed of at least one layer made of a second thermoplastic material, the second material having a fusion temperature higher than the fusion temperature of the first material;

blow molding the parison so as to form a container body with a non-developable surface and heat welding the label onto the external surface of this body, and removing the container provided with the label from the mold, after cooling.

This method is well suited to containers with a non-developable surface, but it can, of course, also be used for containers with a developable surface.

Thanks to the air permeability of the label, air present between the surface of the container body and the label can escape, thus making it possible to avoid the inclusion of air bubbles between the label and the surface of the body.

When, contrary to the invention, a label is used that is not air permeable, many creases and air bubbles are obtained between the label and the body of the container, in particular in zones with a slight curvature. Such a container is unsightly and is not well received by the user.

Since the second material, forming the label, has a fusion temperature that is higher than the fusion temperature of the first material which forms the body of the container, the parison may be at its fusion temperature in a molten state without the label being molten to the same degree, allowing the first material to expand as far as the internal wall of the mold to effect a heat welding with the label. Besides, the fusion temperature of the second material is lower than the temperature of the parison (P) within the mold.

The label layer may be comprised of a plurality of thermoplastic layers, one of which forms a substrate layer. In that case, the material forming the substrate layer shall have a fusion temperature that is higher than the fusion temperature of the material forming the body of the container.

In these conditions, the second material remains sufficiently solid to avoid the complete deformation of the label, while being sufficiently softened to permit its adaptation to the shape of the mold and its adhesion to the shape of the final container body after the blow molding. In these conditions, the softened label is capable of following the non-developable surfaces of the container without forming creases, without tearing the label, and without forming unsightly air bubbles between the external surface of the container and the label.

BRIEF DESCRIPTION OF THE DRAWINGS

To render the present invention more readily understood, an embodiment of a tube-type bottle in accordance with the invention will now be described by way of a purely illustrative and non-restrictive example represented in the attached drawings.

DETAILED DESCRIPTION OF THE PREFERRED EMBODIMENTS

Figure 1:
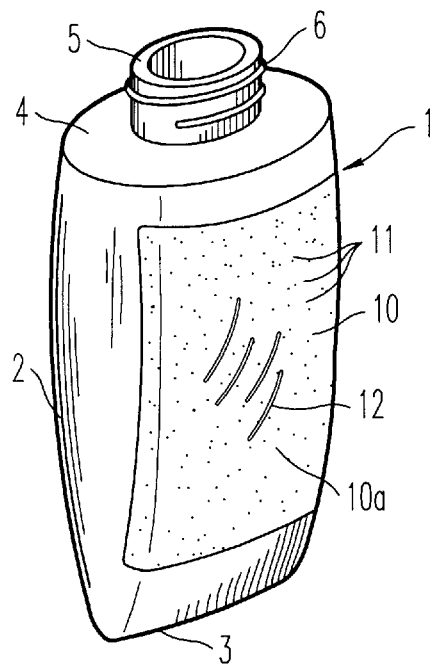
FIG. 1 shows in elevation a bottle in accordance with the invention, having a microperforated label.

A container in accordance with the invention is shown in FIG. 1 in the form of a tube-type bottle 1. This tube-type bottle has a non-cylindrical body 2 of a flattened shape, a first end of which is formed by a rounded bottom 3. A second end remote from the first is provided with a shoulder 4, which is connected to a neck 5 with a cross-section smaller than the cross-section of the body 2, and provided with an external thread 6 intended to receive a stopper (not shown). The body 2 is made of a thermoplastic material such as polypropylene.

The tube-type bottle 1 has at least one printed label 10 contiguous to the body 2 including a design 12, for example a logo or instructions for use of the product inside the bottle 2. The label 10 is made of a sheet of a single layer polyolefin such as polyethylene, or a multilayer of polyethylene and polypropylene having an adhesive coating on one side, the thickness of the label 10 being approximately 0.1 mm. If required, the sheet is transparent. The label 10 is provided over at least one portion with a microperforation formed by a multitude of minuscule holes 11. In practice, the size of the holes 11 is chosen in such a way that they are hardly visible to the naked eye, so as to modify as little as possible the aesthetic appearance and the inscriptions of the design 12 of the label. Advantageously, the size of the holes is in the range of approximately 0.05 mm to 0.5 mm.

As an example, the container is comprised of a mixture of low density polyethylene (50%) and of high density polyethylene (50%). The fusion temperature is about 120° C. The label is comprised of a single layer of polypropylene (which has been printed in a prior step) having a fusion temperature of 160° C. The parison is introduced within the mold at a temperature of about 190° C.

The transition zones boa between the label 10 and the body 2 of the bottle are hardly perceptible. The label is "embedded" in the wall of the bottle.

The manufacture of the tube-type bottle 2 with the label 10 is effected as follows.

Figure 2:
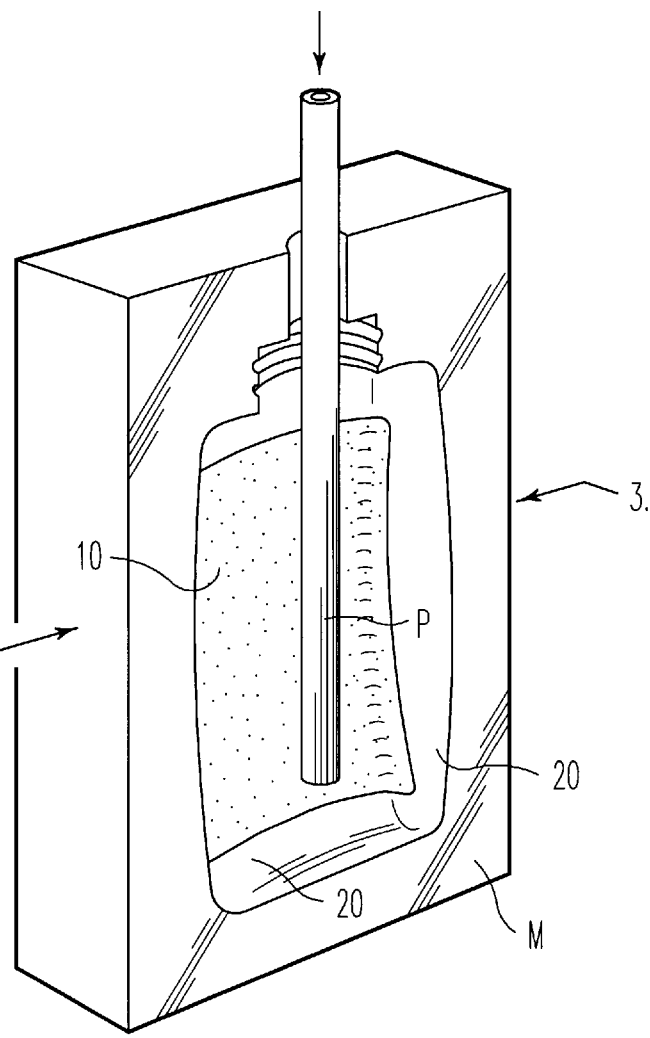
FIG. 2 shows in perspective a mold half matched to the bottle of FIG. 1, this Figure showing a label and a parison before the blow molding of the bottle.

As shown in FIG. 2, a hollow parison P in its hot state is introduced into an openable mold M. This mold has an internal cavity 20 with a rough surface 20*a*, corresponding to the final external shape of the bottle 2. A preprinted label 10 such as described as above, with microperforations 11, is placed into the concavity 20. The label 10 is held in position in the concavity 20 by suction. For this purpose, the concavity 20 has suction openings 21 (see FIG. 3) communicating with a generator of low pressure (not shown).

By blowing compressed air into the parison P, the parison expands and follows the sides of the concavity 20. During this operation, the external surface of the parison presses the label 10 against the internal wall 20*a* of the mold. In accordance with the invention, thanks to the microperforation, the label perfectly follows the body 2 of the bottle and the internal wall of the mold M without the appearance of air bubbles or of creases between the bottle 2 and the label 10.

Figure 3:
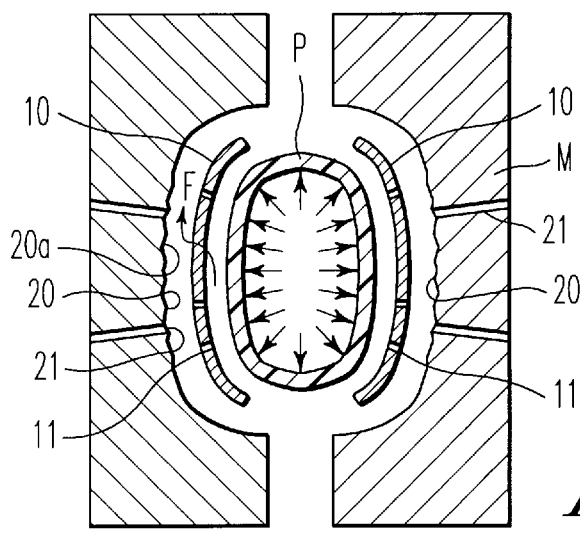
FIG. 3 shows a sectional view, along plane III—III of FIG. 2, illustrating the heat welding operation of the label onto the parison in the mold.

FIG. 3 shows the label 10 placed against the rough internal wall 20*a* of the mold M where it is held in position by suction. It will be seen that any air between the parison P and the label 10 can escape during the expansion of the parison through the perforations 11 of the label, as schematically represented by the arrow F. This air is subsequently routed towards the low pressure (suction) generator via the rough surface 20*a* of the mold and the suction openings 21.

The molten material of the parison P is then welded onto the label. After the tube-type bottle 1 has been cooled and has been ultimately removed from the mold, no formation of creases or air bubbles will be observed between the label 10 and the body 2. Moreover, a tactile test shows that no transition edge can be felt between the label and the body.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A container comprising:

a body made of a first thermoplastic material, with an external surface which is not developable; and at least one decorative label formed of at least one layer of a second thermoplastic material, and having air evacuation means, said second thermoplastic material being directly in contact with and covering part of said external surface which is not developable;

wherein the second material has a fusion temperature higher than a fusion temperature of the first material.

2. A container according to claim 1, wherein the body is obtained by blow molding a parison in a mold.

3. A container according to claim 1, wherein the air evacuation means is formed by microperforation of at least one portion of the label.

4. A container according to claim 1, wherein the air evacuation means is formed by a label made of a nonwoven material formed of fibers.

5. A container according to claim 1, wherein the label has at least one perforation whose diameter is in the range of 0.05 mm to 0.5 mm.

6. A container according to claim 5, wherein the label has a multitude of perforations whose population density is less than 10 perforations/cm$^2$.

7. A container according to claim 1, wherein the label has a thickness of approximately 50 $\mu$m to approximately 300 $\mu$m.

8. A container according to claim 7, wherein the label has a thickness of approximately 80 $\mu$m to approximately 120 $\mu$m.

9. A container according to claim 1, wherein said label is comprised of a plurality of thermoplastic layers, one of which forms a substrate for said label, the fusion temperature of said substrate layer being higher than the fusion temperature of the first material.

10. A container according to claim 2, wherein the second material has a fusion temperature lower than a temperature of the parison.

\* \* \* \* \*